US010385197B2

(12) United States Patent
Defoer et al.

(10) Patent No.: US 10,385,197 B2
(45) Date of Patent: *Aug. 20, 2019

(54) POLYPROPYLENE FILMS WITH IMPROVED SEALING BEHAVIOUR, ESPECIALLY IN VIEW OF IMPROVED SEALING PROPERTIES

(71) Applicant: BOREALIS AG, Vienna (AT)

(72) Inventors: Johan Defoer, Mechelen (BE); Willem De Wever, Hasselt (BE); Sara Croonen, Overpelt (BE)

(73) Assignee: BOREALIS AG, Vienna (AT)

( * ) Notice: Subject to any disclaimer, the term of this patent is extended or adjusted under 35 U.S.C. 154(b) by 46 days.

This patent is subject to a terminal disclaimer.

(21) Appl. No.: 15/535,148

(22) PCT Filed: Dec. 9, 2015

(86) PCT No.: PCT/EP2015/079068
§ 371 (c)(1),
(2) Date: Jun. 12, 2017

(87) PCT Pub. No.: WO2016/091923
PCT Pub. Date: Jun. 16, 2016

(65) Prior Publication Data
US 2017/0342247 A1 Nov. 30, 2017

(30) Foreign Application Priority Data
Dec. 12, 2014 (EP) .................................... 14197547

(51) Int. Cl.
C08L 23/12 (2006.01)
C08L 23/14 (2006.01)
B65D 65/40 (2006.01)
C08J 5/18 (2006.01)
B29C 48/08 (2019.01)
B29C 48/00 (2019.01)
B29K 23/00 (2006.01)
B29K 105/00 (2006.01)

(52) U.S. Cl.
CPC ............. C08L 23/14 (2013.01); B65D 65/40 (2013.01); C08J 5/18 (2013.01); C08L 23/12 (2013.01); B29C 48/022 (2019.02); B29C 48/08 (2019.02); B29K 2023/12 (2013.01); B29K 2105/0085 (2013.01); C08J 2323/14 (2013.01); C08J 2423/08 (2013.01); C08L 2203/10 (2013.01); C08L 2203/162 (2013.01); C08L 2205/02 (2013.01); C08L 2207/02 (2013.01)

(58) Field of Classification Search
CPC ...... C08L 23/12; C08L 23/16; C08L 2203/10; C08L 2201/162; C08L 2207/02; C08L 2205/02; C08J 5/18; C08J 2423/08; C08J 2323/14; B65D 65/40; B29K 2023/12; B29K 2105/0085; B29C 47/0004; B29C 47/0021
See application file for complete search history.

(56) References Cited

U.S. PATENT DOCUMENTS

| 5,358,792 | A | 10/1994 | Mehta et al. | |
| 6,051,653 | A * | 4/2000 | McElrath et al. | ...... C08L 23/16 525/193 |
| 7,582,716 | B2 | 9/2009 | Liang et al. | |
| 2009/0087648 | A1* | 4/2009 | Lee | .......... B32B 27/08 428/336 |
| 2014/0034233 | A1* | 2/2014 | VanSweden et al. | ......... B32B 38/162 156/281 |
| 2015/0315377 | A1* | 11/2015 | Mehta et al. | .......... C08K 3/013 524/525 |
| 2016/0319118 | A1* | 11/2016 | Massari et al. | ......... C08L 23/12 |
| 2017/0335078 | A1* | 11/2017 | Defoer et al. | ............. C08J 5/18 |
| 2017/0342246 | A1* | 11/2017 | Defoer et al. | .......... C08L 23/12 |

FOREIGN PATENT DOCUMENTS

| EP | 0323570 A2 | 11/1988 |
| EP | 0353368 A1 | 2/1990 |
| EP | 0353981 A2 | 2/1990 |
| EP | 0726292 A1 | 2/1996 |
| EP | 0936247 A1 | 8/1999 |
| EP | 1270651 A1 | 1/2003 |
| EP | 1510547 A1 | 3/2005 |
| EP | 1864793 A1 | 6/2007 |
| EP | 1889873 A1 | 2/2008 |
| EP | 2275485 A1 | 1/2011 |
| EP | 2471858 A1 | 7/2012 |
| EP | 2530117 A1 | 12/2012 |
| EP | 2586824 A1 | 5/2013 |
| WO | 0078859 A1 | 12/2000 |
| WO | 0102482 A1 | 1/2001 |
| WO | 01/77224 A1 | 10/2001 |
| WO | 2008/155404 A1 | 12/2008 |
| WO | 2011/039314 A1 | 4/2011 |
| WO | 2011/064124 A1 | 6/2011 |
| WO | 2011/080128 A1 | 7/2011 |

(Continued)

OTHER PUBLICATIONS

International Search Report dated Mar. 3, 2016, from International Application No. PCT/EP2015/079069, 2 pages.

(Continued)

Primary Examiner — Nathan M Nutter
(74) Attorney, Agent, or Firm — Meunier Carlin & Curfman LLC

(57) ABSTRACT

The present invention relates to a polymer blend and the film of the polymer blend or the film layers of the polymer blend as a surface layer or coating. More particularly, the invention relates to a polymer blend which may be extruded as such or extruded onto one or both sides of packaging film to give a sealing surface(s) which exhibits surprisingly heat sealability suitable for form-fill-and-seal-packaging. The present invention also relates the use of ethylene based plastomer to reduce sealability of films comprising polypropylene.

9 Claims, No Drawings

(56) References Cited

FOREIGN PATENT DOCUMENTS

WO    2013/045930  A1    4/2013
WO    2014/048546  A1    4/2014

OTHER PUBLICATIONS

International Search Report dated Feb. 29, 2016, from International Application No. PCT/EP2015/079068, 9 pages.
International Search Report dated Feb. 29, 2016, from International Application No. PCT/EP2015/079070, 10 pages.
Communication pursuant to Article 94(3) EPC dated Apr. 7, 2017, from European Patent Application No. 14 197 550, 3 pages.
European Search Report dated Jun. 1, 2015, from European Patent Application No. 14 197 550, 4 pages.
Engage(TM) Polyolefin Elastomers Product Selection Guide, Aug. 1, 2015, retrieved from http://www.dow.com/scripts/litorder.asp?filepath=elastomers/pdfs/noreg/774-00101.pdf, retrieved on Apr. 21, 2017.

* cited by examiner

POLYPROPYLENE FILMS WITH IMPROVED SEALING BEHAVIOUR, ESPECIALLY IN VIEW OF IMPROVED SEALING PROPERTIES

The present invention relates to a polymer blend and the film of the polymer blend or the film layer of the polymer blend as a surface layer or coating. More particularly, the invention relates to a polymer blend which may be extruded as such or extruded on or onto one or both sides of a packaging film to give a sealing surface(s) which exhibits surprisingly excellent sealability.

Such films are suitable for form-fill-and-seal-packaging.

The present invention also relates the use of ethylene based plastomer to improve sealability of films comprising polypropylene.

BACKGROUND INFORMATION

Films made out of polypropylene random copolymers are very common within the polymer industry and are used in applications that require superior optical properties such as gloss, transparency, surface smoothness, planarity and good tear resistance.

Films made via blown film or cast film extrusion widely used for numerous applications, e.g. in food and textiles packaging, flower wrapping, as photo album page protectors, as coating substrates in extrusion coating processes or laminated to other materials in the formation of more complex films.

Such films are known for their easy processability and sealability. They can be produced on high-speed extrusion lines, even with low thicknesses.

Films made out of polypropylene random copolymers are also very common within the packaging industry, in various packaging techniques, like vertical and horizontal form and fill film packaging.

Said form and fill packaging is commonly applied in the food packaging, especially for the production of bags to be used for solid and/or liquid products. The bags are produced with packaging machines that simultaneously seal the bottom seam of the bag and fills it while it is in the vertical or horizontal position. Thus the sealing, while still in the semimolten/solidifying state, must be able to withstand the weight of the product introduced in the bag and generally also the pressure of air used to assist in transport of the product.

It is a constant need to improve such films in respect of sealing behaviour. This is especially true in view of constant increase of the speed of the packaging lines and consequently demanding conditions on the polymer films and their suitability for fast packaging.

To ensure fast sealing, a low heat sealing initiation temperature is of advantage. By operating at lower temperature there is the benefit of saving energy, hence economic advantages since lower temperatures are of course cheaper to generate and maintain.

There are further advantages by avoiding high sealing temperatures, especially when temperature sensitive goods are to be packed.

DESCRIPTION OF THE PRIOR ART

EP1270651 relates to a polymer film comprising a propylene random copolymer with the comonomer being ethylene or an alpha-olefin, in particular ethylene, having at least four carbon atoms and a total comonomer content of 4.5 to 12 mol %.

A polymer film according the invention shows good optical properties such as high transparency, low haze and high gloss, further good sealing properties, high softness and good slip properties. However, the patent is also silent in respect to the incorporation of ethylene based plastomers.

WO2000/78859 relates to polymer compositions having improved hot tack properties and which are often suitable for coatings and films. More particularly, the invention relates to laminates or multi-layer films having at least one film layer comprising polypropylene or a copolymer thereof and linear ethylene polymer, substantially linear ethylene polymer or low density ethylene polymer.

The composition comprises from 2 to 13 percent by weight of polypropylene homo- or copolymer and from 87 to 98 percent by weight of a polymer selected from the group consisting of linear ethylene polymer, substantially linear ethylene polymer, low density ethylene polymer, and mixtures thereof.

WO0102482 relates to flexible compositions based on propylene polymers having no elastomeric fractions comprising: 10 to 90 parts by weight of random copolymer of propylene and at least one comonomer selected from ethylene and C4-C8 alpha-olefins having a melting point of at least 100° C. and not exceeding 140° C. and a flow index 230° C./2.16 kg from 0.5 to 15 g/10 min, and from 90 to 10 parts by weight of plastomer prepared with participation of a metallocene catalyst and consisting of a random copolymer of ethylene and at least one C3-C10 alpha-olefin having a density of from 0.860 to 0.920 g/cm$^3$, a melt flow index measured at 190/2.16 kg from 0.5 to 30 g/10 min, and a molecular mass distribution Mw/Mn of at most 4. Though the inventions concerns flexible compositions, it is silent about sealing behavior or hot tack properties of the compositions mentioned.

U.S. Pat. No. 7,582,716 relates to film layers and compositions having improved hot tack properties. The compositions comprise at least one ethylene/alpha-olefin interpolymer, though does not give any clear teaching in view of cast films made from polypropylene-random-copolymer.

WO2011/064124 relates to polyolefin blends comprising at least two different polypropylene-copolymers, one of these comprising 1-butene as comonomer and further plastomer components.

The blends are useful in the preparation of heat-sealable films.

U.S. Pat. No. 5,358,792 discloses heat sealable compositions comprising: (a) from about 30 to about 70 weight percent a low melting polymer comprising an ethylene based copolymer having a density of from about 0.88 g/cm3 to about 0.915 g/cm3, a melt index of from about 1.5 dg/min to about 7.5 dg/min, a molecular weight distribution no greater than about 3.5, and a composition breadth index greater than about 70 percent; and, (b) from about 70 to about 30 weight percent of a propylene based polymer having from about 88 mole percent to about 100 mole percent propylene and from about 12 mole percent to about 0 mole percent of an alpha-olefin other than propylene. Further disclosed are films and articles made thereof.

OBJECT OF THE INVENTION

Therefore it is necessary to find a new way for providing polypropylene compositions, which—when converted into films or other final articles—show improved sealing behaviour, especially in the sense of lower sealing initiation temperature.

The present inventors have now sought for solutions how to provide polypropylene compositions having improved properties in respect of sealing behaviour, especially, low sealing initiation temperatures.

The present inventors have surprisingly identified a polypropylene-plastomer-blend comprising 80-93 wt. % of a polypropylene polymer and 7-20 wt. % of an ethylene-based plastomer, wherein
the polypropylene comprises at least ethylene as comonomer and
the ethylene based plastomer has an MFR190/2.16 according to ISO 1133 of at least 0.5 g/10 min In a special embodiment the invention relates to a film made out of the polypropylene-plastomer blend according to the invention comprising 80 wt %-93 wt % of a polypropylene polymer and 7-20 wt % of an ethylene-based plastomer.

In a very special embodiment the invention relates to a container, e.g. pouch or bag, comprising the polypropylene-plastomer blend of the present invention.

In a further special embodiment the invention relates to a process for the production of films having reduced Sealing Initiation Temperature (SIT), comprising the steps of
a.) providing a polypropylene-plastomer-blend by blending of 80-93 wt. % of a polypropylene polymer and 7-20 wt % of an ethylene-based plastomer, wherein
the polypropylene comprises at least ethylene as comonomer and
the ethylene based plastomer has a an MFR190/2.16 of at least 0.5 g/10 min,
b.) forming a film out of the polypropylene-plastomer-blend resulting from step (a).

In a further special embodiment the invention relates to a process for the production of containers comprising films which have reduced Sealing Initiation Temperature (SIT), wherein the process comprises the steps of
a.) providing a polypropylene-plastomer-blend by blending of 80-93 wt. % of a polypropylene polymer and 7-20 wt % of an ethylene-based plastomer, wherein
the polypropylene comprises at least ethylene as comonomer and
the ethylene based plastomer has a an MFR190/2.16 of at least 0.5 g/10 min,
b.) forming a film out of the polypropylene-plastomer-blend resulting from step (a),
c.) converting the film from step (b) on a horizontal or vertical form-fill-and-seal line (FFS-line) into a filled container In a further special embodiment the invention relates to the use of ethylene based plastomers having a density less than 0.915 g/cm$^3$ and an MFR190/2.16 of at least 0.5 g/10 min to reduce the sealing initiation temperature (SIT) of films comprising polypropylene.

DETAILED DESCRIPTION

The present invention will now be described in further detail by the examples provided below:
Polymer Settings
The polypropylene-plastomer-blend according the present invention comprises a polypropylene-plastomer-blend comprising 80-93 wt. % of a polypropylene polymer and 7-20 wt. % of an ethylene-based plastomer, wherein
the polypropylene comprises at least ethylene as comonomer and
the ethylene based plastomer has an MFR190/2.16 according to ISO 1133 of at least 0.5 g/10 min It is stated, that the relative amounts of polypropylene and ethylene based plastomer are to be seen in relation to the sum of (polypropylene+ethylene based plastomer).

Alternatively, the polypropylene-plastomer-blend according the present invention may comprise 8-18 wt % of the ethylene-based plastomer, like 9-17 wt % of the ethylene based plastomer.

The Melt flow rate ($MFR_{230/2.16}$) the polypropylene-plastomer-blend, determined according to ISO1133, can be at most 15.0 g/10 min or below, such as 13.0 g/10 min or below. The Melt flow rate ($MFR_{230/2.16}$) the polypropylene-plastomer-blend, determined according to ISO1133, can be of at least 0.1 g/10 min or higher, such as at least 1.5 g/10 min or higher. For the production of cast films, it is preferred, that the Melt flow rate ($MFR_{230//2.16}$) of the polypropylene-plastomer-blend is in the range of 3.0 to 12.0 g/10 min, more preferably in the range of 4.5 to 11.5 g/10 min, like in the range of 5.0 to 11.0 g/10 min.

For the production of blown films, it is preferred, that the Melt flow rate ($MFR_{230/2.16}$) of the polypropylene-plastomer-blend is in the range of 5.0 g/10 min, or below, more preferably in the range of 4.5 g/10 min or below, like in the range of 0.2-3.8 g/10 min, such as 0.3-3.2 g/10 min, or like 0.3-3.0 g/10 min.

The polypropylene of the polypropylene-plastomer-blend can be a polypropylene-copolymer, comprising at least ethylene as comonomer.

Hence the polypropylene of the polypropylene-plastomer-blend can be a propylene-random copolymer or a propylene-terpolymer.

A propylene random copolymer denotes a copolymer of propylene monomer units and comonomer units in which the comonomer units are randomly distributed in the polymeric chain.

Thereby, a propylene random copolymer includes a fraction, which is insoluble in xylene—xylene cold insoluble (XCU) fraction, in an amount of at least 70 wt %, more preferably of at least 80 wt %, still more preferably of at least 85 wt % and most preferably of at least 90 wt %, based on the total amount of the propylene random copolymer.

Accordingly, the random copolymer does not contain an elastomeric polymer phase dispersed therein.

The propylene random copolymer used in the polypropylene composition of the invention comprises at least ethylene as comonomer. Copolymers comprising two or more comonomers are herein defined as terpolymers.

It is envisaged within the present invention that additional comonomers can be present, such as $C_4$ to $C_6$ alpha-olefins. The propylene copolymer may therefore comprise ethylene and one or more comonomers, preferably just one additional comonomer.

In a specific embodiment the terpolymer is a terpolymer of propylene, ethylene and 1-butene only.

The propylene random copolymer or terpolymer used in the polypropylene composition with the comonomer being ethylene and optionally an alpha-olefin having at four to six carbon atoms has a total comonomer content of 1.0 to 12.0 wt. %, like 1.5-11.0 wt. %, such as 2-10.5 wt. %.

In case the propylene random copolymer is used it is further preferred, the total ethylene content of the copolymer is 1.0 wt. % or more, such as 1.5 wt % or 2.0 wt % or more. It is further preferred, the total ethylene content of the copolymer is 9.0 wt. % or less. Especially preferred are propylene random copolymers with ethylene contents in the range of 2.5 or 3.0 wt % to 8.0 wt. % or less, like 3.5 or 4.0 wt % to 7.0 wt %

Preferably the terpolymer has a rather high content of propylene (C3), i.e. at least 83.0 wt %, i.e. equal or more than 86 wt %, such as 90.0 wt %, more preferably equal or more than 92.0 wt %, yet more preferably equal or more than 94.0 wt %, like equal or more than 94.5 wt %.

Another preferred requirement of the terpolymer is that the amount of ethylene within the terpolymer is lower compared to the amount of the C4 to C6 α-olefin. Accordingly it is appreciated that the weight ratio of ethylene to the C4 to C6 α-olefin is in the range of 1/100 to below 1/1, more preferably in the range of 1/10 to 1/2, yet more preferably in the range of 1/6 to 1/2.5, like 1/5.5 to 1/2.5.

Accordingly it is preferred that the ethylene content within the terpolymer is in the range of 0.1 to 3.0 wt %, more preferably in the range of 0.5 to 2.8, like in the range of 0.7 to 1.7 wt %.

Further it is preferred that the C4 to C6 α-olefin, i.e. the 1-butene or 1-hexene, within the terpolymer is in the range of 1 to 14 wt %, more preferably in the range of 1.5 to 13, like in the range of 2.0 to 12.0 wt % or 3.0 wt % to 11.0 wt % or 3.0 wt % to 10 wt %.

It is especially preferred that the terpolymer of propylene (C3), ethylene (C2) and one C4 to C6 α-olefin has a total comonomer content, i.e. a content of ethylene (C2) and the C4 to -C6 α-olefin together, in the range of 17 wt % or below, like 16 wt % or 14.5 wt %, such as 4.1 to 13.0 wt %, preferably of 4.5 to 12.0 wt %, more preferably of 6.0 to 10.5 wt %.

The Melt flow rate ((MFR$_{230/2.16}$) of the polypropylene comprised in the polypropylene-plastomer-blend, is determined according to ISO1133, and can be in the range of 1.5 to 10.0 g/10 min, more preferably in the range of 1.8 to 8.5 g/10 min, like in the range of 2.0 to 8.0 g/10 min.

The polypropylene (PP) can be further unimodal or multimodal, like bimodal in view of the molecular weight distribution and/or the comonomer content distribution; both unimodal and bimodal polypropylenes are equally preferred.

The polypropylene of the polypropylene-plastomer-blend can be produced by polymerisation in the presence of any conventional coordination catalyst system including Ziegler-Natta, chromium and single site (like metallocene catalyst), preferably in the presence of a Ziegler-Natta catalyst system.

It is envisaged within the scope of the present invention, that the polypropylene of the polypropylene-plastomer-blend can be produced by polymerisation in the presence of polymeric nucleating agents.

The nucleated polypropylene composition in accordance with the present invention is furthermore characterized in that it comprises a polymeric nucleating agent. Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

Such polymeric nucleating agent can be for instance incorporated by the so called BNT-technology (i.e. inreactor nucleation).

It is also possible, to use polymers, which already contain the polymeric nucleating agent (so-called master batch technology) in order to introduce the polymeric nucleating agent into the polypropylene of the polypropylene-plastomer-blend of the current invention.

The polypropylene according to the present invention may contain commonly used additives like:

phenolic antioxidants like 2,6-di-tert.buty-4-methylphenol (CAS 128-37-0, BHT); Pentaerithrityl-tetrakis(3-(3',5'-di-tert.butyl-4-hydroxyphenyl)-propionate) (CAS 6683-19-8, Irganox 1010);

Octadecyl-3-(3',5'-ditert.butyl-4-hydroxyphenyl)-propionate) (CAS 2082-79-3, Irganox 1076), phosphorus-containing antioxidants like Tris(2,4-di-tert.butylphenyl)-phosphite (CAS 31570-04-4, Irgafos 168); Bis(2,4-di-tert.butylphenyl)-pentaerithrityl-di-phosphite (CAS 26741-53-7, Ultranox 626), C-radical scavengers like 5,7-di-tert.butyl-(3-(3,4-di-methylphenyl)3H-benzofuran-2-one (CAS 181314-48-7, HP 136)

acid scavengers like Calcium stearate (CAS 1592-23-0); Zinc stearate (CAS 557-05-1);

Hydrotalcite (CAS 11097-59-9)

UV-stabilisers like Bis-(2,2,6,6-tetramethyl-4-piperidyl) sebacate (CAS 52829-07-9, Tinuvin 770); 2-hydroxy-4-n-octoxy-benzophenone (CAS 1843-05-6, Chimassorb 81) nucleating agents like sodium benzoate (CAS 532-32-1); 1.3:2,4-bis(3,4-dimethylbenzylidene)sorbitol (CAS 135861-56-2, Millad 3988) antiblocking agents like natural or synthetic silica (CAS 7631-86-9);

pigments like carbon black, TiO2 or the like in quantities of 100-10.000 ppm for each single component.

Plastomer

The plastomer comprised of the polypropylene-plastomer-blend according to the present invention is a very low density polyolefin; more preferably a very low density polyolefin polymerised using single site, preferably metallocene catalyst.

Typically, such polyolefin plastomers are ethylene copolymers, also referred herein as ethylene based plastomer.

The ethylene based plastomer suitable for the current inventions is a copolymer of ethylene and propylene or a C4-C10 alpha-olefin.

Suitable C4-C10 alpha-olefin include 1-butene, 1-hexene and 1-octene, preferably butene or octene and more preferably octene.

Preferably copolymers of ethylene and 1-octene are used.

Suitable ethylene based plastomers have a density in the range of 0.860-0.915 g/cm3, preferably in the range of 0.860 to 0.910 g/cm3, more preferably in the range of 0.860-905 g/cm3 and most preferably in the range of 0.865-885 g/cm3.

The ethylene based plastomers have a melt flow rate MFR190/2.16, of at least 0.5 g/10 min, like 1.0 g/10 min, preferably of least 2.5 g/10 min, such as at least 5.0 g/10 min, like 7.0 g/10 min or higher, or at least 9 g/10 min or higher.

The ethylene based plastomer suitable may also have an MFR190/2.16 of less than about 30 g/10 min, like less than 25 g/min, such as less than 21 g/10 min, preferably between 1.0 and 18 g/10 min and more preferably between 2.5 and 15 g/10 min, such as 3.0-12 g/10 min.

The melting points ($T_m$) of suitable ethylene based plastomers (measured with DSC according to ISO 11357-3: 1999) are below 130° C., preferably below 120° C., more preferably below 110° C. and most preferably 100° C. or below, such as 90° C. or lower, like at most 85° C., like 80° C. or lower.

Furthermore suitable ethylene based plastomer have a glass transition temperature Tg (measured with DMTA according to ISO 6721-7) of below −25° C., preferably below −30° C., more preferably below −35° C.

In case the ethylene based plastomer is a copolymer of ethylene and propylene it has an ethylene content from 10 to 55 wt %, preferably from 15 to 50 wt % and more preferably from 18 to 48 wt %.

In case the ethylene based plastomer is a copolymer of ethylene and a C4-C10 alpha olefin it has an ethylene content from 50 to 95 wt %, preferably from 55 to 90 wt % and more preferably from 60 to 85 wt %.

The molecular mass distribution Mw/Mn is most often below 4, such as 3.5 or below, but is at least 1.7. It is preferably between 3 and 1.8.

Ethylene based plastomers suitable for the current invention are commercially available, i.a. from Borealis Plastomers (NL) under the trade name Queo, from DOW Chemical Corp (USA) under the trade name Affinity or Engage, or from Mitsui under the trade name Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by C1-4 alkyl group such as pentane, methyl pentane, hexane, heptane, octane, cyclohexane, methylcyclohexane and hydrogenated naphtha. More preferably unsubstituted C6-10-hydrocarbon solvents are used.

A known solution technology suitable for the process according to the invention is the COMPACT technology.

Inventors have found that especially good results in view of SIT can be achieved, when ethylene based plastomers are used, which have good flowability, i.e. their MFR on the higher side of the given ranges.

Additionally inventors found beneficial, when the ethylene based plastomers have their density on the lower side of the given ranges.

It was further found beneficial, if the ethylene based plastomers have low melting points, i.e. have their melting point on the lower side of the given ranges.

So preferred are ethylene based plastomer having an MFR190/2.16 of least 5.0 g/10 min, like 7.0 g/10 min or higher or at least 9.0 g/10 min or higher.

Likewise preferred are ethylene based plastomers having a density of at most 905 kg/m$^3$, like 890 kg/m$^3$ or below, like 885 kg/m$^3$ or below.

Likewise preferred are ethylene based plastomers having and an melting point Tm of at most 100° C. or lower, like at most 90° C. or lower, like at most 85° C., like 80° C. or lower.

Especially preferred are ethylene based plastomers having a density of at most 905 kg/m$^3$, like 890 kg/m$^3$ or below, an MFR190/2.16 of least 5.0 g/10 min, like 7.0 g/10 min or higher and optionally an melting point Tm of at most 100° C. or lower, like at most 90° C. or lower, like at most 85° C.

Very especially preferred are however ethylene based plastomers having a density of at most 885 kg/m$^3$ or below, an MFR190/2.16 of least 8.5 g/10 min optionally an melting point Tm of at most 100° C. or lower, like at most 90° C. or lower, like at most 85° C.

Further especially preferred are however ethylene based plastomers having a density of at most 885 kg/m$^3$ or below, an MFR190/2.16 of least 8.5 g/10 min and an melting point Tm of 80° C. or lower.

Blends suitable for the present invention can be produced by dry-blending/mixing of the blend partners or by melt mixing of the melt partners.

Dry blending can be done by using tumble-mixers or the like.

Melt mixing and extrusion can be conducted in single- or twin screw extruders, as well as Banbury type mixers, Farrel kneaders or Buss co-kneaders.

The choice for suitable extruders or kneaders and their operation are within the skill of the person skilled in the art.

In a special embodiment the invention relates to a film made out of the polypropylene-plastomer blend according to the invention, which comprises 80-93 wt % of a polypropylene polymer and 7-20 wt % of an ethylene-based plastomer.

Films according the present invention can be produced with several known conversion techniques, such as extrusion via blown or cast film technology.

Extruded articles produced via blown or cast film technology, such as blown or cast films, are preferred, extruded articles produced via cast film technology, such as cast films, are especially preferred Films according to the present invention may be non-oriented, mono-axially or bi-axially oriented.

It is preferred, that the films are non-oriented.

Especially preferred are however cast-films, especially preferred are non-oriented cast films.

The films according to the present invention have preferably a thicknesses in the range of 70 µm or below, such as 60 µm or 55 µm or below.

The films (or single layer of multilayer films) can also have a thickness of 1 µm or above such as 3 µm, 5 µm 7 µm or 10 µm or above.

Preferred are films having a thickness of 15 µm or higher, such as 20 µm or 25 µm.

Very preferred are films having film thicknesses of 10-55, such as 15-50.

Very especially preferred are films having a thickness of 10-40 µm, such as 15-35 µm.

Equally preferred are films having a thickness of 30-60 µm, such as 35-55 µm, like 45-55 µm.

Films according to the present invention have reduced Sealing initiation temperature (SIT) to provide fast processing on e.g. packaging lines. Hence it is preferred that the SIT of the films is at most 140° C. or lower, such as 138° C. or lower, like 135° C. or lower, such as 132° C. or lower.

Films according to the present invention may be mono- or multilayer films, comprising one or more layers, like two, three or five layers, even up to seven, up to 9 or up to 12 layers, wherein multilayer films are preferred.

Further preferred are multilayer films with 3 or more layers, such as multilayer films with 5-7 layers.

In multilayer films comprising the polypropylene plastomer blend of the current invention, the polypropylene plastomer blend of the current invention may be contained by at least one of the layers.

It is envisaged by the invention that the polypropylene-plastomer-blend of the current invention may be also comprised by more than one layer of the multilayer film. It may be also comprised by all layers of the multilayer film.

It is within the scope of the invention, that a layer comprising the polypropylene blend of the present invention may be extruded on or onto one or both sides of a packaging film to give a sealing surface(s).

However, it is preferred, if the polypropylene blend of the current invention is comprised by at least one or both outer layers.

It is further preferred, that any outside layer comprises the polypropylene plastomer blend of the current invention It is especially preferred, that the polypropylene blend of the current invention is comprised by just one outer layer.

Films comprising the polypropylene-plastomer blend of the current invention are also advantageous to be processed on FFS-lines (Form-Fill-Seal-lines).

Films comprising the polypropylene-plastomer blend of the current invention can be further converted to form containers for packaging purposes So in a very special embodiment the invention relates to a container comprising the polypropylene-plastomer blend of the present invention.

Examples for such containers are mentioned in the non-limiting list, like bags, pouches like stand-up-pouches, pillow-shaped, stick pack, quad seal, flat bottom, sachet, brick with fold down, stand-up with carry handle, tetrahedron, gusseted, pillow with hole punch/euro slot and the like.

Stand-up-pouches (SUP) and pillow shaped packages are especially preferred.

Hence such containers according to the present invention comprise films which have preferably a thickness in the range of 70 µm or below, such as 60 µm or 55 µm or below.

The films (or single layer of multilayer films) can also have a thickness of 1 µm or above such as 3 µm, 5 µm 7 µm or 10 µm or above.

Preferred are films having a thickness of 15 µm or higher, such as 20 µm or 25 µm.

Very preferred are films having film thicknesses of 10-55 µm, such as 15-50 µm.

Very especially preferred are films having a thickness of 10-40 µm, such as 15-35 µm.

Equally preferred are films having a thickness of 30-60 µm, such as 35-55 µm, like 45-55 µm.

Containers according to the present invention may comprise monolayer or multilayer films.

Containers according to the present invention may be sealed and filled on different sites or on the same sites, such as using a Form-Fill-Seal-line (FFS-line, cf. details below).

This invention addresses the problems associated with sealing vertical and horizontal form and fill packages. Packaging may be accomplished by filling with food, medical solutions, etc. from a horizontal position where the item is inserted into the package from a side opening in the package. Often times it is desirable to fill a package from a vertical position. This is often desirable when filling a bag with a free-flowing composition or with several items which would render a horizontal filling process cumbersome.

So a special embodiment of the present invention comprises a process for the production of containers comprising a film according to the present having a reduced Sealing Initiation Temperature (SIT), wherein the process comprises the steps of a) providing a polypropylene-plastomer-blend by blending of 80-93 wt. % of a polypropylene polymer and 7-20 wt % of an ethylene-based plastomer, wherein the polypropylene comprises at least ethylene as comonomer and the ethylene based plastomer has a an MFR190/2.16 of at least 0.5 g/10 min, b) forming a film out of the polypropylene-plastomer-blend resulting from step (a), c) converting the film from step (b) on a horizontal or vertical form-fill-and-seal line (FFS-line) into a filled container.

Such Form Fill Seal (FFS) machines are packaging machines that form, fill and seal a package on the same machine.

The main types are vertical form fill seal (VFFS) and horizontal form fill seal (HFFS) machines; in both cases packaging material is fed off a roll, shaped, and sealed. The bags/packs are then filled, sealed and separated.

Both vertical form fill seal (VFFS) and horizontal form fill seal (HFFS) machines are equally preferred.

A further special embodiment of the present invention is the use of ethylene based plastomers having a density less than 0.915 g/cm$^3$ and an MFR190/2.16 of at least 0.5 g/10 min to improve i.e. reduce the sealing initiation temperature (SIT) of films comprising polypropylene.

The invention is further laid out by means of examples:

Experimental Part:

Measuring Methods

The following definitions of terms and determination methods apply for the above general description of the invention as well as to the below examples unless otherwise defined.

Melt Flow Rate (MFR)

The melt flow rates of polypropylenes are measured at 230° C. with a load of 2.16 kg (MFR$_{230/2.16}$) according to ISO 1133

The melt flow rates of ethylene based plastomer are measured at 190° C. with a load of 2.16 kg (MFR$_{230/2.16}$) according to ISO 1133

For Calculating the MFR of the polypropylene-plastomer blends as indicated in Table 1, the following formula was applied:

$$\log_{10}[MFR(Blend)] = w1*\log_{10}(MFR1) + w2*\log_{10}(MFR2) \quad \text{Equation 1: Calculated MFR}$$

wherein w1 and w2 denominate the relative weight fraction of the blend partners, e.g. plastomer and polypropylene resin. MFR1 or MFR2 denominate the MFR of the respective blend partners determined at the same condition, i.e. at the same temperature and loading.

For the polypropylene resin the MFR230/2.16 as measured was applied.

The MFRs of the plastomers are usually measured at lower temperatures, i.e. MFR190/2.16, so the values were multiplied to by factor 1.8 to reflect the (higher) flowability at higher temperatures.

Melting Temperature $T_m$, Crystallization Temperature $T_c$, is measured with Mettler TA820 differential scanning calorimetry (DSC) on 5-10 mg samples.

Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950). With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E\,[\text{mol \%}] = 100*fE$$

The weight percent comonomer incorporation was calculated from the mole fraction:

$$E\,[\text{wt \%}] = 100*(fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Density

The density was measured according to ISO 1183D and ISO1872-2 for sample preparation.

Sealing Initiation Temperature (SIT)

The method determines the sealing temperature range (sealing range) of polymer films. The sealing temperature range is the temperature range, in which the films can be sealed according to conditions given below.

The sealing initiation temperature (SIT@1.5 N) is the sealing temperature at which a sealing strength of >1.5 N is achieved.

The sealing initiation temperature (SIT) is determined on a J&B Universal Sealing machine Type 3000 (PSN620706) with a cast film of 50 μm thickness applying the following further parameters:
Specimen width: 25.4 mm
Seal Pressure: 0.1 N/mm²
Seal Time: 0.1 sec
Cool time: 99 sec
Peel Speed: 10 mm/sec
Start temperature: 120° C.
End temperature: 180° C.
Increment: 10° C.

Specimen are sealed against each other, the corona treated side in the middle, seal bar temperature were chosen in between 120° C. and 180° C. with 10° C. difference between each.

The seal strength (force) is determined at temperature.

A PET-tape having 25 μm thickness was used as carrier for preparing and sealing the PP-film-samples to avoid sticking to the seal bar and elongation of the seal as such.

The Seal initiation Temperature indicates the temperature, at which the seal strength has reached 1.5N is determined on the graphs derived from the sealing tests.

Material Description:

Queo™ 8203 is an ethylene based octene plastomer, MFR(190/2.16) of 3 g/10 min, MWD: unimodal, density 0.882 g/cm³, melting point: 74° C., produced in a solution polymerisation process using a metallocene catalyst.

Queo™ 8210 is an ethylene based octene plastomer, MFR(190/2.16) of 10 g/10 min, MWD: unimodal, density 0.882 g/cm³, melting point: 75° C., produced in a solution polymerisation process using a metallocene catalyst.

Queo™ 0210 is an ethylene based octene plastomer, MFR(190/2.16) of 10 g/10 min, MWD: unimodal, density 0.902 g/cm³, melting point: 97° C., produced in a solution polymerisation process using a metallocene catalyst.

Queo™ plastomers are commercially available from Borealis.

RD208CF is a polypropylene-ethylene random copolymer, MFR (230/2.16) of ca 8 g/10 min, Tm of ca 140° C., C2-content of 4 wt %, visbroken.

RD204CF is a polypropylene-ethylene random copolymer, MFR (230/2.16) of ca 8 g/10 min, Tm of ca. 150° C., C2-content of 2 wt %, visbroken.

Film Production:

The films used for the Inventive Examples (IE) and the comparative examples (CE) had a thickness of 50 μm.

They were produced on a Reifenhauser CAST pilot line, equipped with an extruder type RH241-1-50-25, 50 mm diameter L/D ratio: 25, and an extruder type RT78-1-35-25 35 mm diameter L/D ratio 25; a feeding block with 3 feedings; a coat hanger die having a die width of 450 mm, die gap: 0.8 mm. The films were produced via 2 chill rolls, having a diameter of 320 mm each.

Prior to the film extrusion, the ethylene based plastomer was dry blended into the polypropylene polymers in the weight-ratios as indicated further below, using a tumbler mixer.

The melt temperature of the polypropylene-plastomer blends and the pure polypropylenes was 230° C.; the temperature of the chill roll was 20° C., roll speed: 10 m/min.

Electric pinning via electrostatic charging was applied.

All the films used were corona treated; the treated surfaces became the inner layer(s) of the sealed films.

The surface treatment of the films was done using a Corona Generator G20S supplied by AFS, the energy loading was 800 W for all samples, the frequency used was in the range of 26 kHz to 28 kHz. Care was taken that the distance of the charging bar to the film was equal over the whole width of the film. Film speed at corona treatment was 10 m/min.

TABLE 1

|  | Wt % |  | Calculated MFR (230° C./2.16 kg) g/10' | Seal strength Average [N] | Seal strength Max. Val. [N] | SIT [°C.] @ 1.5N |
|---|---|---|---|---|---|---|
| Queo 8203 in ↓ |  |  |  |  |  |  |
| RD208 CF | 0 | CE | 8.0 | 2.29 | 2.72 | 156 |
| RD208 CF | 5 | CE | 7.8 | 2.51 | 3.56 | 153 |
| RD208 CF | 10 | IE | 7.7 | 2.74 | 3.18 | 138 |
| RD208 CF | 15 | IE | 7.5 | 2.77 | 3.52 | 137 |
| Queo 8210 in ↓ |  |  |  |  |  |  |
| RD208 CF | 5 | CE | 8.3 | 2.72 | 3.00 | 147 |
| RD208 CF | 10 | IE | 8.7 | 3.63 | 6.40 | 135 |
| RD208 CF | 15 | IE | 9.0 | 4.49 | 6.11 | 127 |
| Queo 0210 in ↓ |  |  |  |  |  |  |
| RD208 CF | 0 | CE | 8.0 | 2.29 | 2.72 | 156 |
| RD208 CF | 10 | IE | 8.7 | 2.98 | 3.65 | 137 |
| RD208 CF | 15 | IE | 9.0 | 3.25 | 4.06 | 136 |
| RD204CF | 10 | IE | 8.7 | * n.m. | * n.m. | 134 |
| RD204CF | 15 | IE | 9.0 | 3.02 | 4.73 | 132 |

* n.m. = value not measured

The invention claimed is:

1. A polypropylene-plastomer-blend comprising 80-93 wt. % of a polypropylene random copolymer and 7-20 wt. % of an ethylene-based plastomer, based on the sum of the amount of the polypropylene random copolymer and the ethylene-based plastomer, wherein
the polypropylene random copolymer comprises at least 1.5 wt % ethylene as a comonomer, and the polypropylene random copolymer does not comprise an elastomeric polymer phase dispersed therein,
the ethylene based plastomer has an MFR190/2.16 according to ISO 1133 of at least 2.5 g/10 min, and
the ethylene based plastomer is a copolymer of ethylene and 1-hexene with an ethylene content of from 50 to 95 wt % or the ethylene based plastomer is a copolymer of ethylene and 1-octene with an ethylene content of from 50 to 95 wt %.

2. The polypropylene-plastomer-blend according to claim 1, wherein the ethylene based plastomer has a density ISO 1183D of 0.915 g/cm³ or below.

3. The polypropylene-plastomer-blend according to claim 1, wherein the MFR(230/2.16) of the polypropylene-plastomer-blend according to ISO 1133 is from 2.5 to 15 g/10 min.

4. A film comprising the polypropylene-plastomer blend according to claim 1.

5. The film according to claim 4, wherein the film is produced via blown film or cast film production and wherein the blown or cast film has a Sealing Initiation Temperature (SIT) of at most 140° C.

6. A container comprising the polypropylene-plastomer blend according to claim 1.

7. A process for the production of films having reduced Sealing Initiation Temperature (SIT), the process comprising the steps of:
a. providing a polypropylene-plastomer-blend by blending 80-93 wt. % of a polypropylene random copolymer and 7-20 wt % of an ethylene-based plastomer, based on the sum of the amount of the polypropylene random copolymer and the ethylene based plastomer, wherein the polypropylene random copolymer comprises at least 1.5 wt % ethylene as a comonomer, and the polypropylene random copolymer does not comprise an elastomeric polymer phase dispersed therein, the ethylene based plastomer has a an MFR190/2.16 of at least 2.5 g/10 min, and the ethylene based plastomer is a copolymer of ethylene and 1-hexene with an ethylene content of from 50 to 95 wt % or the ethylene based plastomer is a copolymer of ethylene and 1-octene with an ethylene content of from 50 to 95 wt %; and b. forming a film out of the polypropylene-plastomer-blend resulting from step (a).

8. A process for the production of containers comprising a film having a reduced Sealing Initiation Temperature (SIT), wherein the process comprises the steps of a. providing the polypropylene-plastomer-blend of claim 1 by blending 80-93 wt. % of the polypropylene random copolymer and 7-20 wt. % of the ethylene-based plastomer, b. forming a film out of the polypropylene-plastomer-blend resulting from step (a), and c. converting the film from step (b) on a horizontal or vertical form-fill-and-seal line (FFS-line) into a filled container.

9. A method of use of ethylene based plastomers having a density less than 0.915 g/cm$^3$ and an MFR190/2.16 of at least 2.5 g/10 min to reduce the sealing initiation temperature (SIT) of films comprising polypropylene.

* * * * *